United States Patent [19]

Miyota et al.

[11] Patent Number: 5,372,667
[45] Date of Patent: * Dec. 13, 1994

[54] METHOD OF MANUFACTURING A SEAT USING ADHESIVE

[75] Inventors: Akihiro Miyota; Shuichi Hashiguchi, both of Tochigi, Japan

[73] Assignee: Tokyo Seat Co., Ltd., Saitama, Japan

[*] Notice: The portion of the term of this patent subsequent to Feb. 15, 2011 has been disclaimed.

[21] Appl. No.: 924,517

[22] Filed: Aug. 4, 1992

[30] Foreign Application Priority Data

Aug. 9, 1991 [JP] Japan ................. 3-223691

[51] Int. Cl.$^5$ ............................................. B32B 31/20
[52] U.S. Cl. ................... 156/213; 156/214; 156/221; 156/285; 156/311; 297/DIG. 1; 297/DIG. 2
[58] Field of Search ............... 156/212, 213, 390, 285, 156/290, 245, 311, 220, 221, 214, 285; 264/321; 297/DIG. 1, DIG. 2

[56] References Cited

U.S. PATENT DOCUMENTS

| | | | |
|---|---|---|---|
| 3,318,636 | 5/1967 | Callum | 156/212 |
| 4,420,351 | 12/1983 | Lussi et al. | 156/311 |
| 4,665,606 | 5/1987 | Saito et al. | 297/DIG. 1 |
| 4,692,199 | 9/1987 | Kozlowski et al. | 156/245 |
| 4,795,517 | 1/1989 | Elliott et al. | 156/290 |
| 4,796,954 | 1/1989 | Saito | 297/DIG. 1 |
| 4,844,761 | 7/1989 | Bracesco | 264/321 |
| 4,925,513 | 5/1990 | Witzke et al. | 156/213 |
| 5,000,805 | 3/1991 | Lowe | 156/285 |
| 5,066,351 | 11/1991 | Knoll | 156/311 |

FOREIGN PATENT DOCUMENTS 3-68391  3/1991  Japan .

Primary Examiner—Michael Ball
Assistant Examiner—Michele K. Yoder
Attorney, Agent, or Firm—Hill, Steadman & Simpson

[57] ABSTRACT

In a method of manufacturing a seat by using adhesives in which an air permeable skin material and a cushioning pad are bonded to each other by means of reactive hot-melt adhesives, the method comprises a step of coating adhesives to the cushioning pad, a step of provisionally assembling the skin material to the cushioning pad from the side of the adhesive coating surface, a step of setting the provisionally assembled cushioning pad and skin material to an attaching die, a step of applying heating by a heating die to the skin material and the cushioning pad attached in the attaching die assembling step from the side of the skin material and a step of applying cooling under pressure by a cooling die from the surface of the skin material subsequent to the heating step. A seat comprising a skin material and a cushioning pad can be molded with a seat frame by this method. It enables easy positioning, bonding of the skin material even to a deep recess of the cushioning pad, shortening the molding cycle, and keeping the raised skin material intact.

2 Claims, 12 Drawing Sheets

METHOD OF MANUFACTURING A SEAT USING ADHESIVE

CROSS-REFERENCES TO RELATED APPLICATION

This application is related to copending application Ser. No. 07/932,672 filed Aug. 20, 1992, entitled "METHOD OF MANUFACTURING A SEAT USING DEVICE", in which the inventors are Akihiro Miyota and Shuichi Hashiguchi, assigned to the assignee of the present application.

BACKGROUND OF THE INVENTION

1. Field of the invention

The present invention concerns a vehicle seat and, more in particular, it relates to a method of manufacturing a vehicle seat comprising a cushioning pad and a skin material covering the cushioning pad in which the cushioning pad and the skin material are integrated by means of adhesives.

2. Description of the Prior Art

In manufacturing a seat by using adhesives, a skin material and a cushioning pad are disposed between upper and lower dies, and bonded integrally by interposing adhesives between the skin material and the cushioning pad. Hot-melt adhesive in the form of an adhesive film or solvent type adhesives have been used for the adhesives.

In the case of using the hot-melt type adhesives, a high heat resistance is required for the skin material and the cushioning pad and, in addition, there is a problem that a thermal load is applied to the skin material and the cushioning pad since a higher temperature is required for melt-bonding of adhesives. In a case of using the solvent type adhesives, since adhesion is formed already upon coating the adhesive, it has been a problem that the cushioning pad and the skin material are bonded at the stage of contact.

For overcoming the foregoing problems, a technique of using reactive hot-melt adhesives has been proposed (for example, refer to Japanese Patent Laid Open No. 68391/1991).

Also in the technique proposed above, bonding between the skin material and the cushioning pad in the production of the seat has been conducted in the same way as in the prior art, by using upper and lower dies, disposing the skin material conforming to one of the dies while disposing the cushioning pad on the other of the dies correspondingly, coating adhesives at least on one of the opposing surfaces of the cushioning pad and the skin material, applying pressure and heating and, further, applying cooling to the side of the skin material.

When the skin material and the cushioning pad are disposed in the separate upper and lower dies in this way for the bonding between the surface layer and the cushioning pad, attachment of the cushioning pad to the die and that of the skin material to the die have to be conducted separately in the bonding step of the skin material and the cushioning pad. Further, if the skin material and the cushioning pad are disposed separately to the upper and the lower dies, respectively, as described above, it is necessary that one of the upper die and the lower die is cooled simultaneously with heating so as to make the molding cycle satisfactory. However, application of heating and cooling by the identical die after bonding the skin material and the cushioning pad results in heating or cooling of the identical tie itself, which makes the molding cycle longer and increases the production time. Further, since the cushioning pad and the skin material are heated, cooled and press-bonded by the identical die, this causes fluffs in the raised skin material.

OBJECT AND THE SUMMARY OF THE INVENTION

It is an object of the present invention to provide a method of manufacturing a seat by using adhesives, capable of easy positioning even when adhesives are used, as well as capable of bonding a skin material even to a deep recess of a cushioning pad, shortening a molding cycle in a bonding step and preventing fluffs in raised skin material.

Another object of the present invention is to provide a method of manufacturing seat using adhesives, which is capable of molding skin material and cushioning pads with a seat frame.

The foregoing object of the present invention can be attained in accordance with a present invention by a method of manufacturing a seat by using adhesives in which an air permeable skin material and a cushioning pad are bonded to each other by means of reactive hot-melt adhesives, wherein the method comprises a coating step of coating adhesives to the cushioning pad, provisional assembling step of provisionally assembling the skin material to the cushioning pad from the side of the adhesive coating surface, an attaching die assembling step of setting the provisionally assembled cushioning pad and skin material to an attaching die, a heating step of applying heating by a heating die to the skin material and the cushioning pad attached in the attaching die assembling step from the side of the skin material and a cooling/press-bonding step of applying cooling under pressure by a cooling die from the surface of the skin material subsequent to the heating step.

The foregoing object can be attained also in a method of manufacturing a seat comprising an air permeable skin material, a cushioning pad and a frame by using adhesives which the skin material and the cushioning pad are bonded each other by means of reactive hot-melt adhesives, wherein the method comprises a coating step of coating adhesives to the cushioning pad, a step of assembling the frame to an attaching die, an assembling step of attaching the cushioning pad to the frame assembled to the attaching die and further attaching the skin material to the cushioning pad from the side of the adhesive coating surface successively, a heating step of applying heating by a heating die to the frame, the cushioning pad and the skin material attached in the assembling step from the side of the skin material, and a cooling/press-bonding step of applying cooling under pressure by a cooling die from the surface of the skin material subsequent to the heating step.

As the reactive hot-melt adhesives used in each of the methods described above, there can be mentioned, for example, those having active double bonds and curable, for example, by UV-rays and electron rays during hot-melt bonding, those having epoxy groups and latent curing material and curable by heat, those having NCO groups, Si(OR)$_3$ groups, and curable with water content or those having SH groups and metal oxide catalyst and curable with oxygen, urethane type wet curing adhesives being particularly preferred.

As has been described above, according to the present invention, since the adhesion becomes latent after the solidification of the adhesives by using the reactive hot-melt adhesives, if the cushioning pad and the skin material are assembled provisionally, they are not bonded directly and the their positioning is easy, That is, since the adhesion of the adhesives is made latent before press-bonding of the skin material and the cushioning pad, they are not bonded and they can be positioned relative to each other by provisional assembling. Then, even if the cushioning pad includes deep recesses, etc. the skin material can be bonded conforming with the recessed shape by forcing it into the recess. Further, it has been inevitable, in existent hot-melt adhesives, to use those having high softening point and high melting point if high heat resistance is required. However, since the heat resistance is developed after the adhesion reaction in the hot-melt adhesives, the melting temperature for the adhesives can be lowered (for example, 60° C.). Since the temperature required for the bonding can thus be lowered, degradation such as occurrence of fluffs of the raised skin material can be prevented.

Then, since the heating die and the cooling die are used separately, heating and cooling periods can be shortened to reduce the processing cycle. In addition, since the press-bonding is conducted by the cooling die, press-bonding is applied during cooling to prevent the attachment of the raised skin material and the degradation of the skin material.

Further, according to the present invention, the cushioning pad and the seat frame can be molded simultaneously.

BRIEF DESCRIPTION OF THE DRAWINGS

These and other advantages, features and additional objects of the present invention will be obvious to those skilled in the art from the following descriptions for preferred embodiments and illustrated embodiments with reference to the drawings, wherein.

DESCRIPTION OF THE PREFERRED EMBODIMENTS

FIG. 1 through FIG. 7 show a preferred embodiment according to the present invention and the description will be made of this embodiment for a seat which is used for vehicle seat as an example. The seat S comprises an air permeable skin material H and a cushioning pad P. The cushioning pad P is covered with the skin material H. The cushioning pad P and the skin material H are joined and bonded integrally with adhesives A.

The method of manufacturing the seat S using the adhesives A in this embodiment comprises the following steps:

During a coating step 10 (FIG. 2) of coating adhesives A are applied to the cushioning pad P. During a provisional assembling step 20 (FIG. 3) the skin material H is applied to the cushioning pad P from the side of the coating surface of the adhesives A. In an attaching die assembling step 30 (FIG. 4) for setting the provisionally assembled cushioning pad P and the skin material H in an attaching die. A heating step 40 (FIG. 5) for applying heat with a heating die to the skin material H and the cushioning pad P which is attached during the attaching die assembling step from the side of the skin material H. A cooling/press-bonding step 50 (FIG. 6) of applying cooling under pressure with a cooling die from the surface of the skin material H after the heating step.

Figure 1:
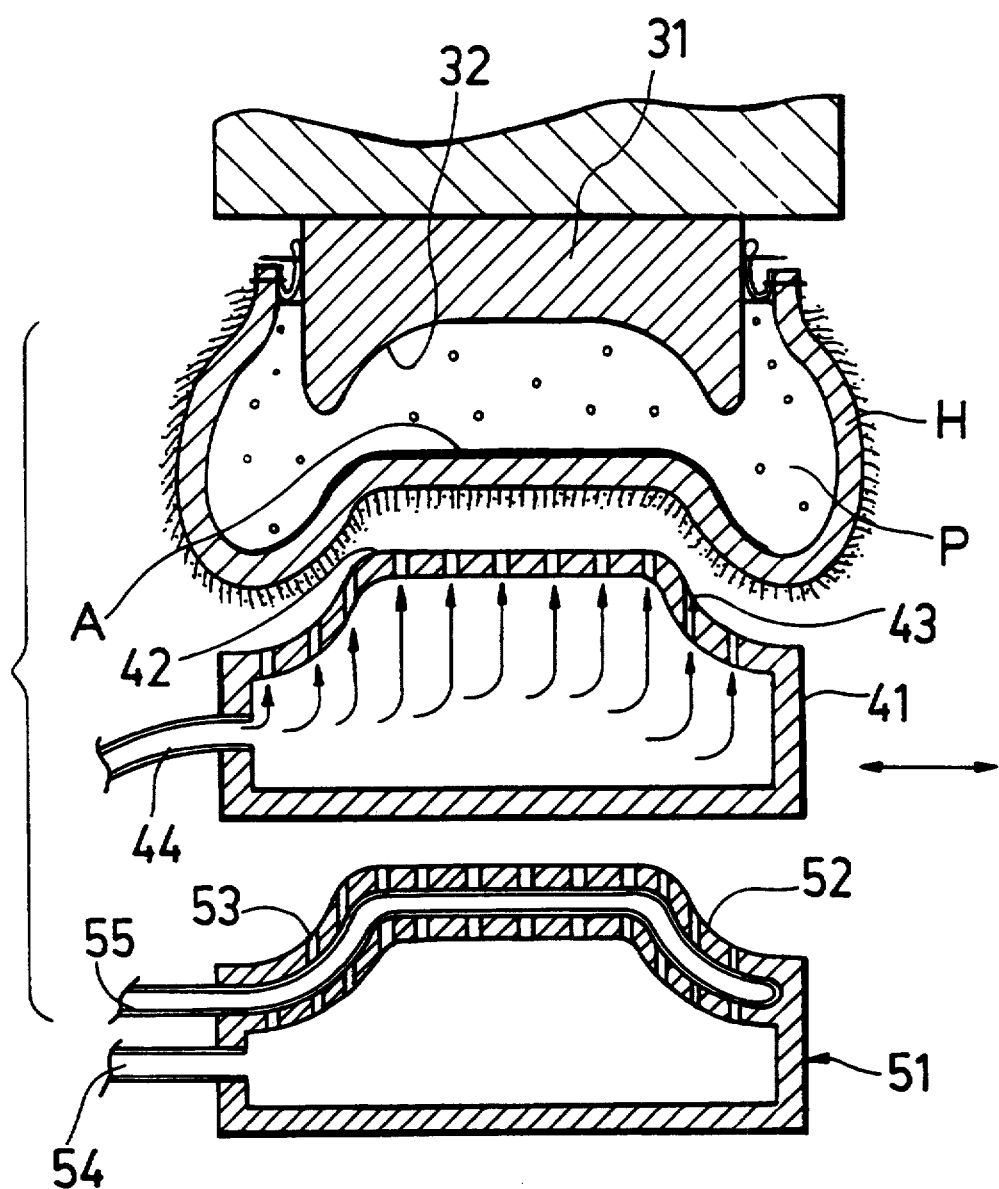
FIG. 1 is a schematic view illustrating a manufacturing apparatus for one embodiment of the present invention.
Figure 2:
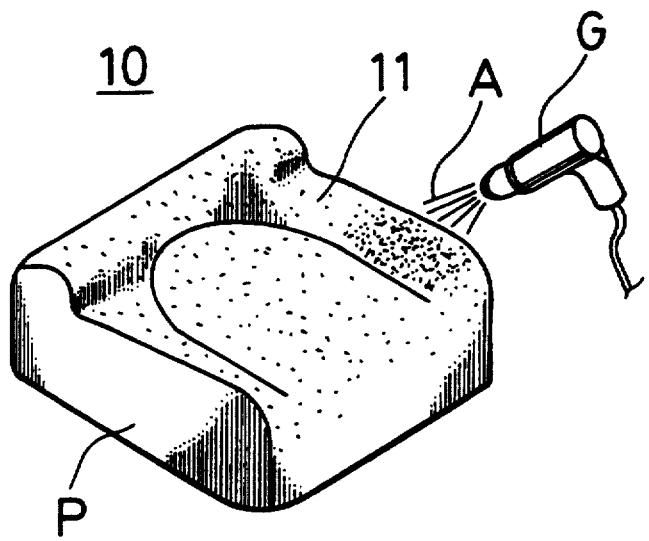
FIG. 2 is an explanatory view illustrating a step of a first embodiment according to the present invention.

As shown in FIG. 2, during the step 10 of coating the adhesives A are coated on the cushioning pad P in this embodiment. Molten reactive hot-melt adhesives A are uniformly coated on the cushioning pad P on a joining surface 11 thereof with the skin material H by using a spray gun G which has been exclusively designed therefor. The reactive hot-melt adhesives A used in this embodiment, can be for example, those having active double bonds and which are curable by UV-rays, electron rays, etc. during hot-melt bonding, those having epoxy groups and latent curing material and which are curable by heat, those having NCO groups, Si(OR)$_3$ groups and which are curable by water content and those having SH groups and metal oxide catalyst and which are curable with oxygen, urethane type wet curable adhesives A being particularly preferred. More specifically, commercially available moisture curable hot-melt adhesives mainly composed of a polyester type isocyanate prepolymer may be used (for example, "Hibon 4832", registered trade mark of products available from Hitachi Kasei Polymer Co.).

When the reactive hot-melt adhesives A are coated on the cushioning pad in this way, since the adhesives A are cooled so they solidify just after the coating, transportation and provisional assembling of the surface skin H are possible. As to the coating of the adhesives A, it is not required to apply them over the entire surface of the cushioning pad P but they may be coated only on a reversed "R" portion (that is, a concave portion) of the cushioning pad P.

Figure 3:
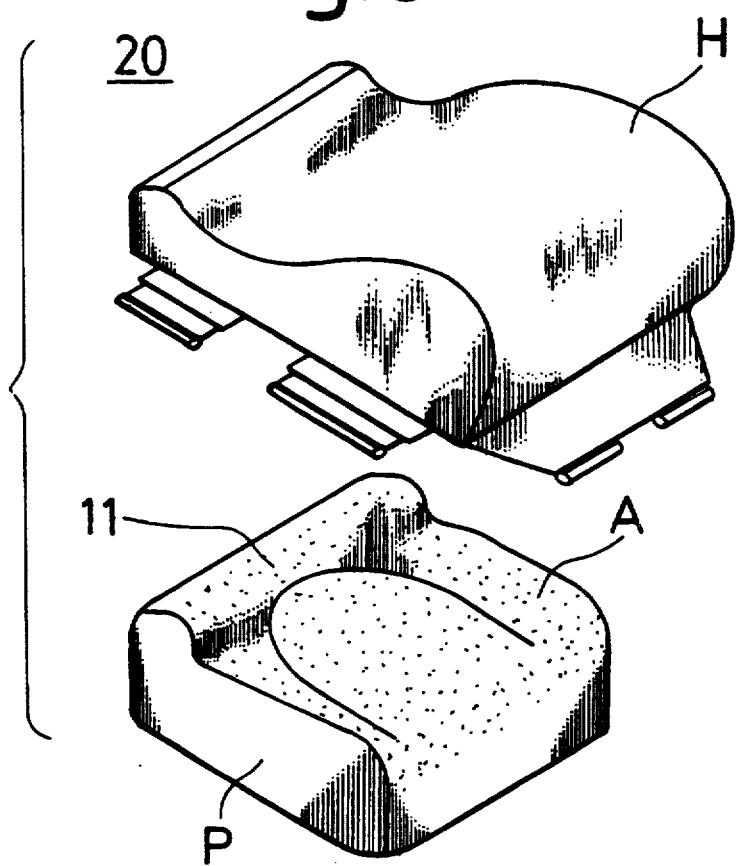
FIG. 3 is an explanatory view illustrating a step of the first embodiment according to the present invention.

Then, after coating the adhesives A on the cushioning pad P as described above, a provisional assembling step 20 of provisionally assembling the skin material H to the cushioning pad P from the side of the coating surface of the adhesives A is done as shown in FIG. 3. That is, after coating the adhesives A to the cushioning pad P, the skin material H placed over the cushioning pad P. The skin material H in this embodiment has been previously molded such that conforms the shape of the cushioning pad P, but it may be a skin material H which has not had such preliminary molding.

Figure 4:
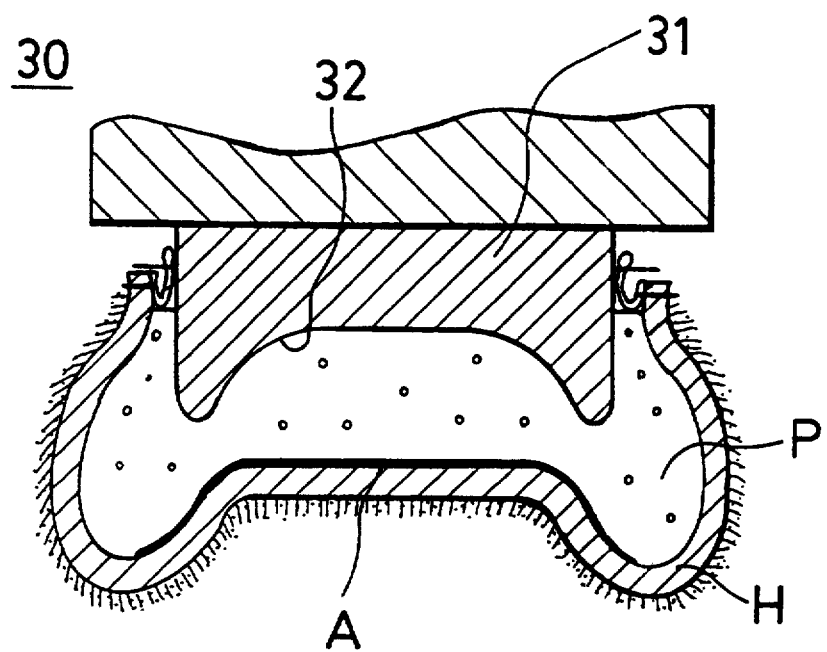
FIG. 4 is an explanatory view illustrating a step of the first embodiment according to the present invention.

Then, during as shown in FIG. 4, during an attaching die assembling step 30 is used for setting the cushioning pad P and skin material H that were provisionally assembled to an attaching die 31. That is, the cushioning pad P is attached to an attaching die 31 which has a die surface 32 which conforms to the shape of the cushioning pad P on the which is opposite to the side covered with the skin material P. In this case, the ends of the surface material H are secured by means of a fixing tool such as a needle or hook (not illustrated).

Figure 5:
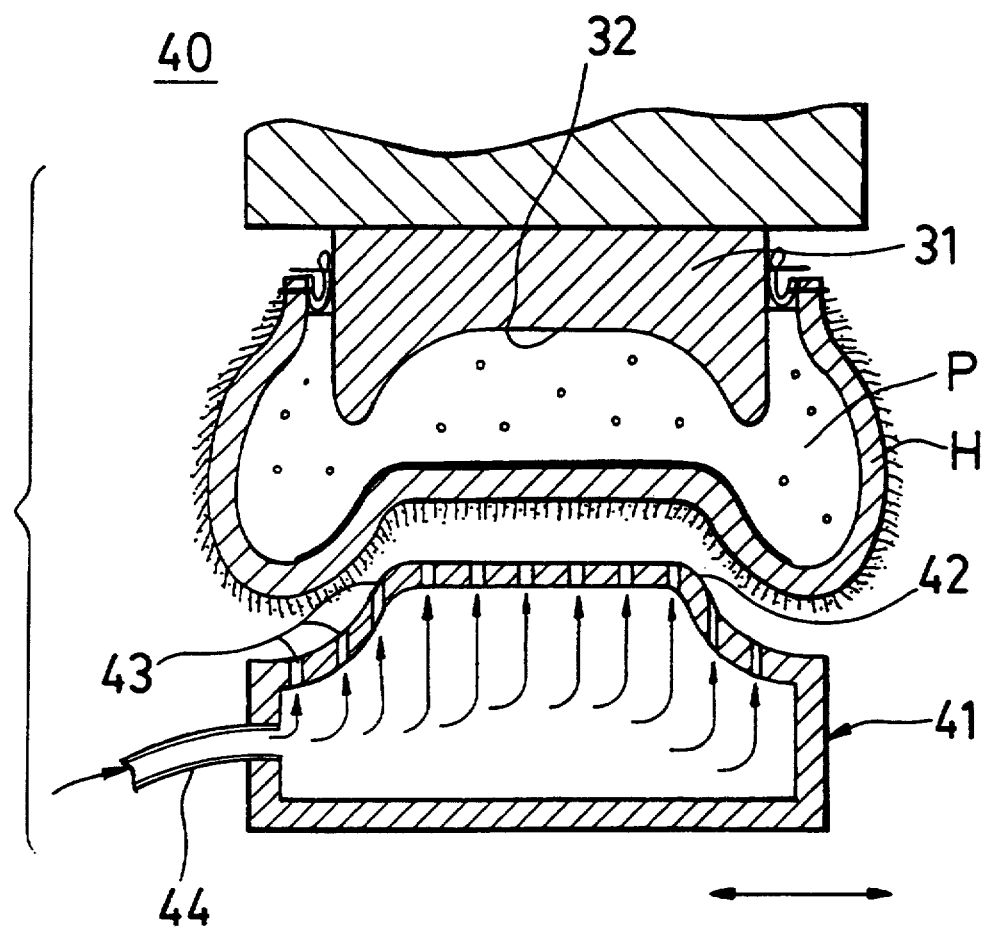
FIG. 5 is an explanatory view illustrating a step of the first embodiment according to the present invention.

Then, as has been described above, during a heating step 40 the skin material H and the cushioning pad P are attached by applying heat with a heating die 41 from the side of the skin material H as shown in FIG. 5. That is, the heating die 41 in this embodiment is in the form of a hollow box, and is made slidable in the right and left directions (FIGS. 1 and 5) between the attaching die 31 and the cooling die 51. A die surface 42 of the heating die 41 has a shape which conforms to the surface of the seat S (the shape on the side of the cushioning pad P and the skin material H). A plurality of through holes 43 are formed in the die surface 42. Further, a connection pipe 44 is disposed at a predetermined position on the side of the heating die 42, so that steam or hot air is introduced from the connection pipe 44 into the heating die 42. Accordingly, heating can be applied from the side of the skin material H by positioning the heating die 42 near to the provisionally assembled cushioning pad P and skin material H, by which the reactive hot-melt adhesives A coated to the cushioning pad P can be reactivated and melted. After melting the reactive hot-melt adhesives A in this way, the supply of the steam or hot air to the heating die 42 is stopped and the heating die 42 is moved away. When a buffer such as a skeleton foam is disposed on the upper surface of the through holes 43 of the heating die, the skin material H and the cushioning pad P can be heated uniformly to prevent formation of fluffs.

Then, subsequent to the heating step 40 described above, a cooling/press-bonding step 50 comprising applying cooling under pressure with a cooling die 51 from the surface of the skin material H to the sides of the cushioning pad P. The cooling die 51 in this embodiment is in the form of a box. A die surface 52 has a shape conforming to the surface shape of the seat S (shape on the side of the skin material H) and a plurality of through holes 53 are formed in the die surface 52. A connection pipe 54 and a cooling pipe 55 are disposed at predetermined positions on the side of the cooling die 51. Cooling water is circulated through the cooling water pipe 55, while air is introduced from the connection pipe 54, so that cooling air jets out from the through holes 53. Then, the cooling die 51 is clamped with a predetermined pressure to the side of the cushioning pad P and air jets out through the through holes 53 for cooling.

In an illustrated example, air is introduced into the cooling die 51, but it may be also adapted so as to suck air. In a case of using steam for the heating die, excess steam present in the skin material H and the cushioning pad P can be removed from the side of the skin material H by sucking air as described above.

Figure 7:
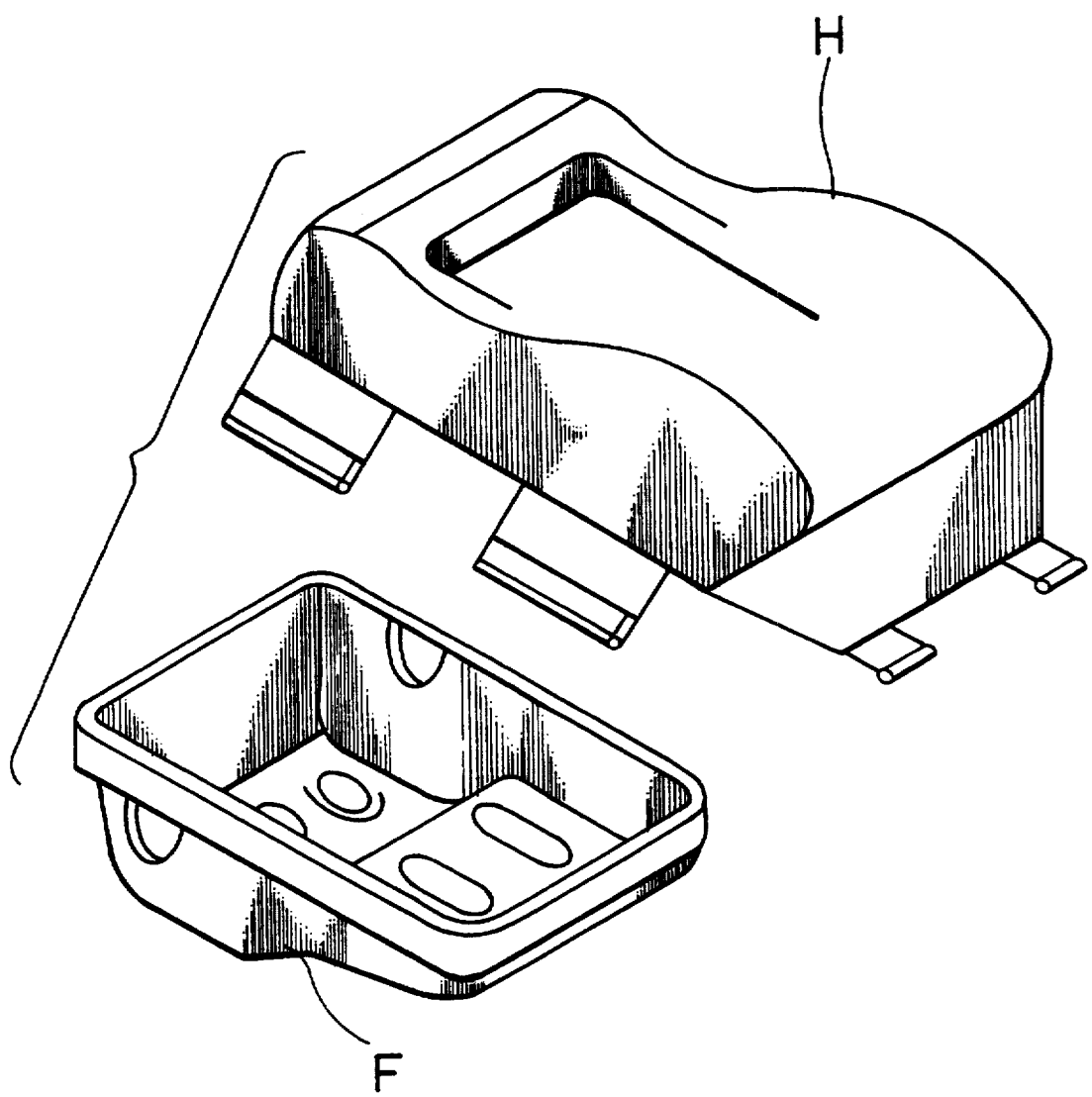
FIG. 7 is an explanatory view illustrating a step of the first embodiment according to the present invention.

Then, a seat S comprising the integrated skin material H and the cushioning pad P is taken out of the attaching die 31 during the assembling step 32. Then, as shown in FIG. 7, it is assembled to a frame F.

Figure 6:
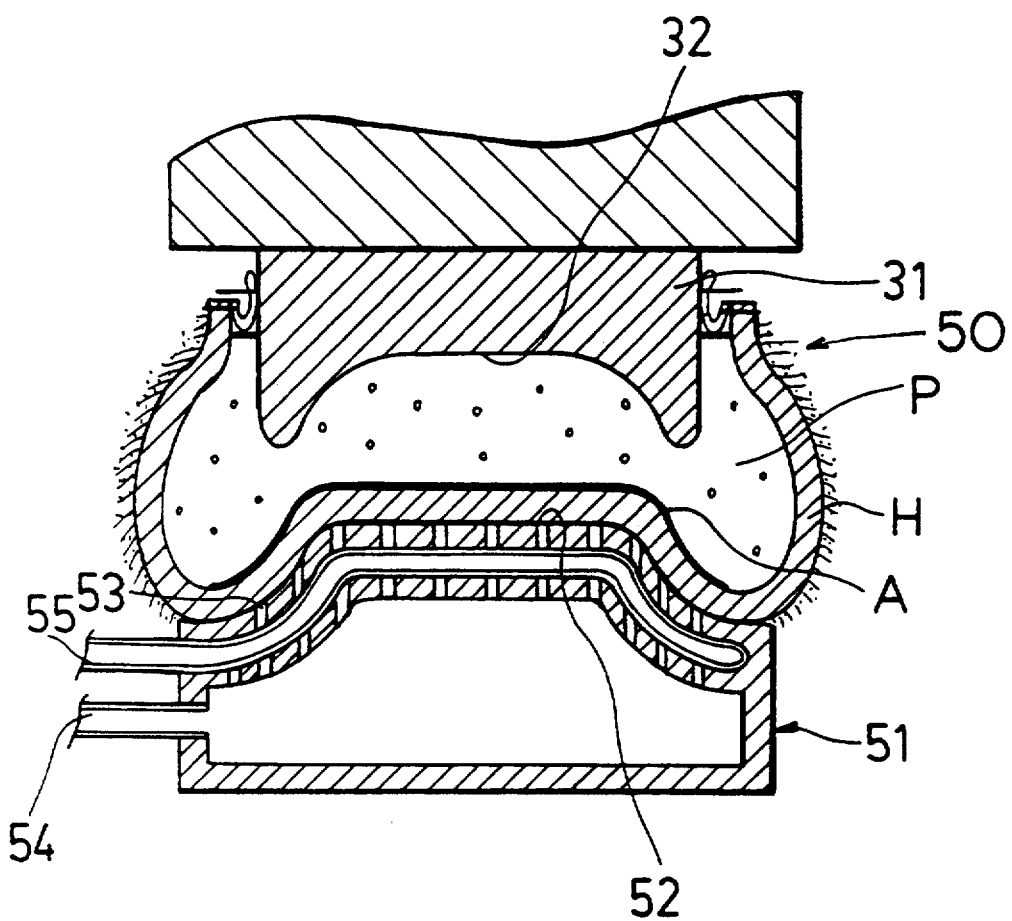
FIG. 6 is an explanatory view illustrating a step of the first embodiment according to the present invention.
Figure 8:
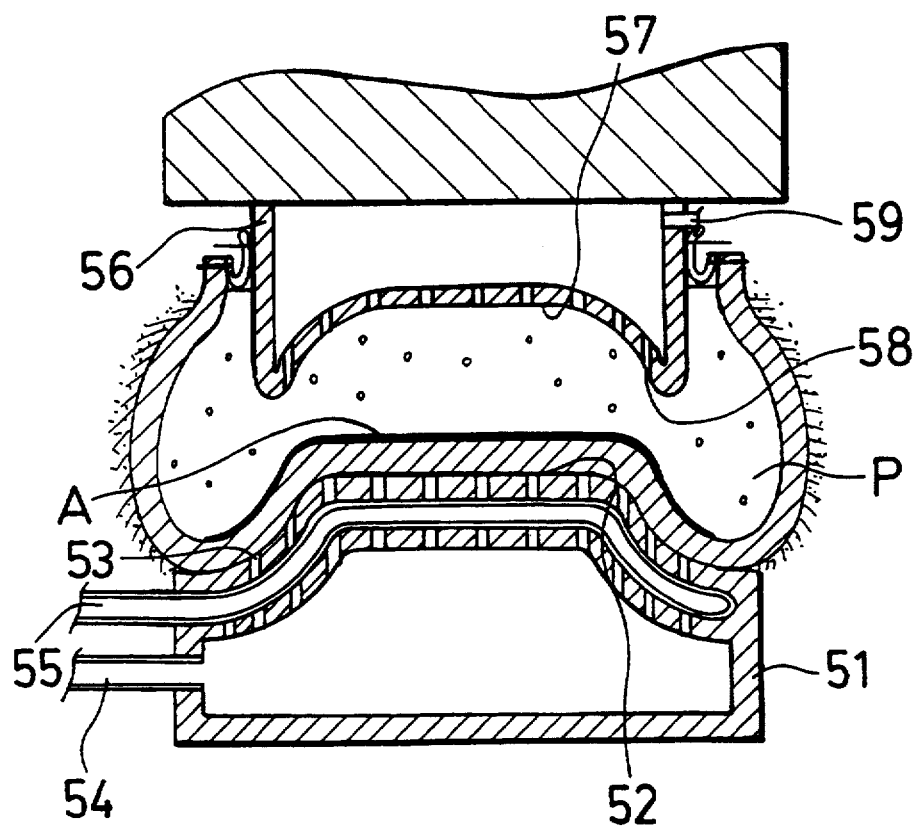
FIG. 8 is an explanatory view illustrating a step of a second embodiment according to the present invention.
Figure 9:
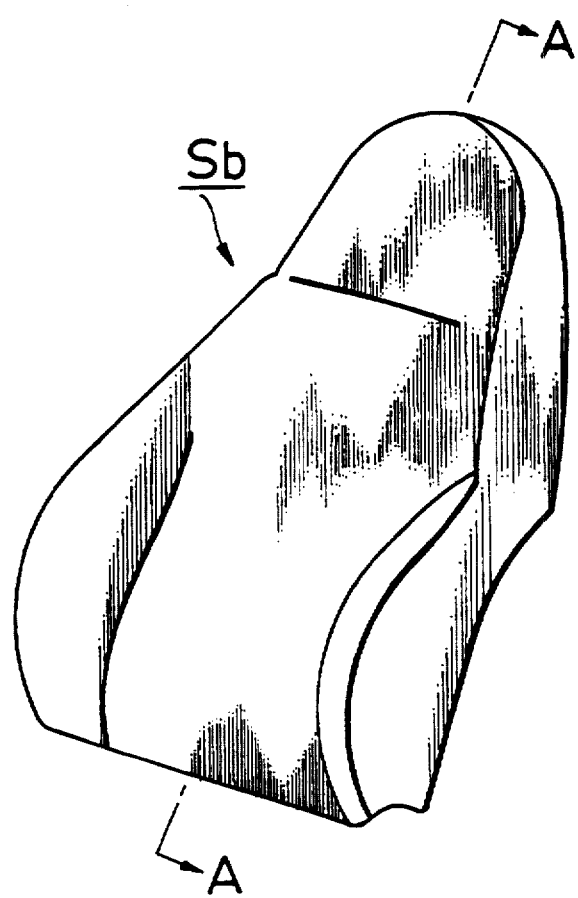
FIG. 9 is a perspective view illustrating a third embodiment according to the present invention.
Figure 10:
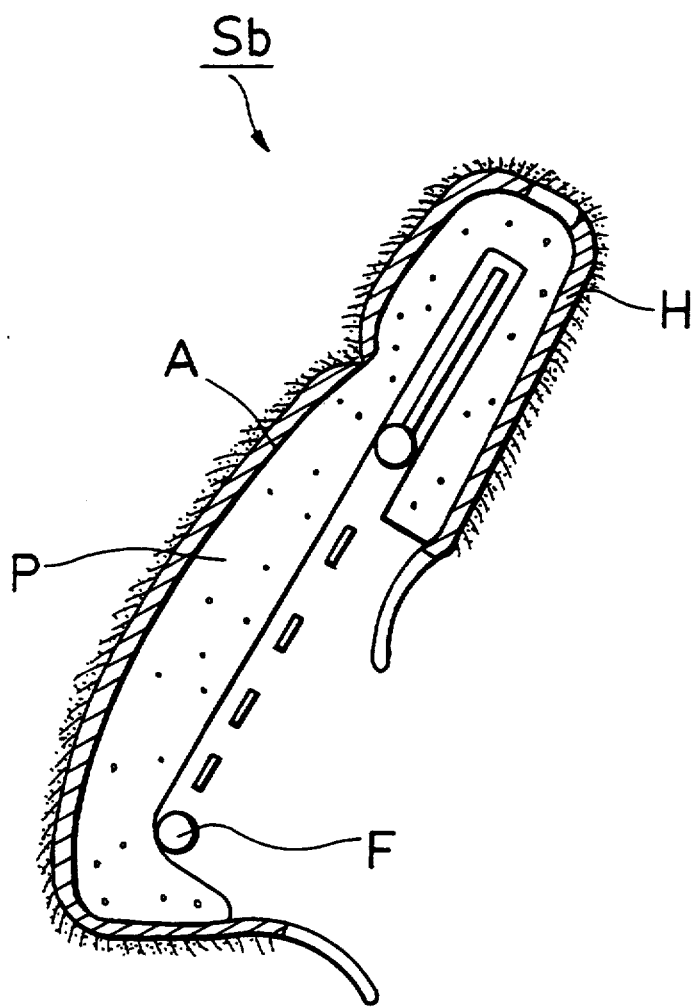
FIG. 10 is a cross sectional view taken along lines A—A in FIG. 9.

FIG. 8 shows another embodiment of the cooling/press-bonding step 50 described above. In this embodiment, the device shown in FIG. 6 is used as the cooling die and an air sucking means is formed to the attaching die used in the attaching die assembling step 30. That is, an attaching die 56 is formed as a hollow box and a plurality of air holes 58 are formed in a die surface 57 of the attaching die 56 that is in contact with the cushioning pad P, and an air sucking device (not illustrated) is connected by way of a connection pipe 59 to the attaching die 56.

In this embodiment, cooling air can be caused to flow through the skin material H and the cushioning pad P to improve the cooling effect, as well as excess water content can be eliminated from the entire portion of the skin material H and the cushioning pad P.

FIG. 9 through FIG. 13 illustrate an example of molding a skin material H, a cushioning pad P and a frame F simultaneously.

Description will be made in this embodiment of a seat S used as a vehicle seat bag Sb, as an example. Also in this embodiment, the coating step 10 for coating the adhesives A to the cushioning pad P, the heating step 40 for applying heat by the heating die 41 to the skin material H and attaching the cushioning pad P during the attaching die assembling step 30 from the side of the skin material and the cooling/press-bonding step 50 of applying cooling under pressure by the cooling die 51 from the surface of the skin material H subsequent to the heating step 40 are the same as the example shown in FIG. 1 through FIG. 7 and accordingly, detailed explanations therefor are omitted.

The seat bag Sb in this embodiments uses a skin member in which a skin material H is covered over the cushioning pad P so as to be formed into a bag and a seat frame F is disposed on the inside of the skin member in the form of a bag. The seat frame F in this embodiment has attaching brackets B formed on both lower sides of a frame member. The brackets B have two holes 61 formed on one side and a hole 62 formed on the other side.

Figure 11:
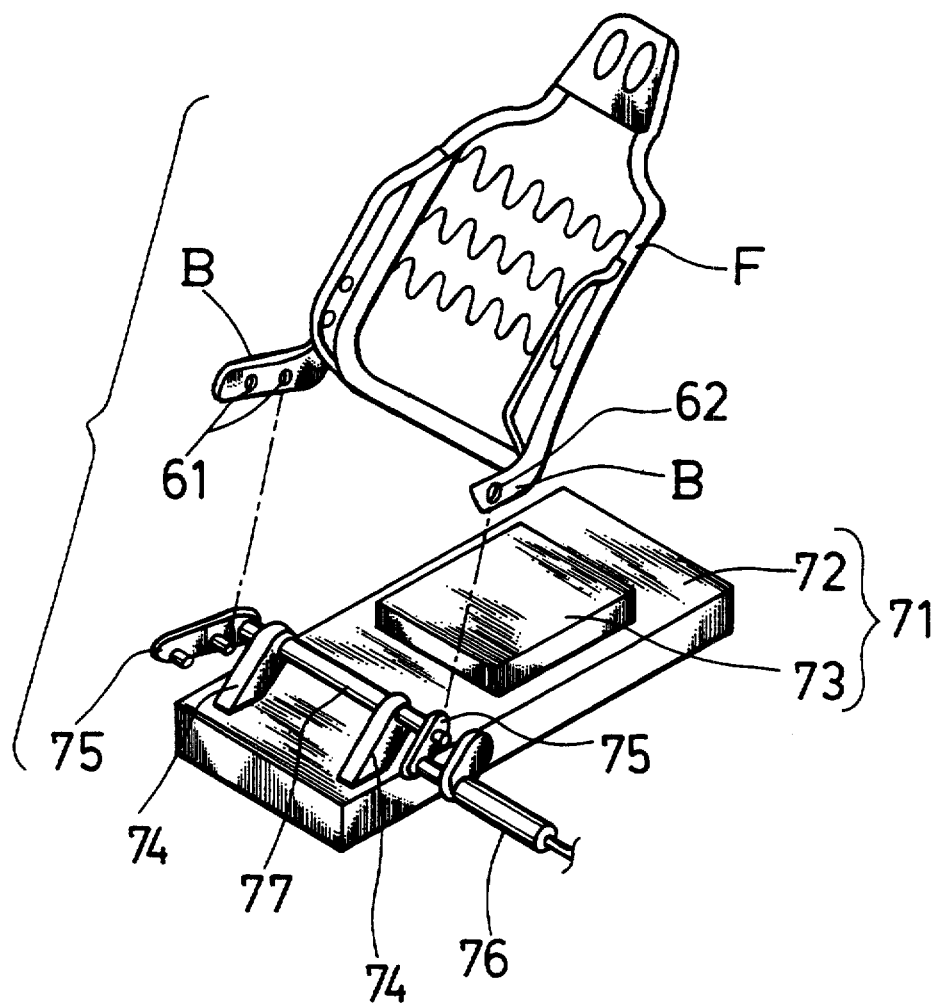
FIG. 11 is a perspective view of an apparatus used for the third embodiment according to the present invention.

As shown in FIG. 11, an attaching die 71 during the attaching die assembling step 70 in this embodiment comprises a frame receiving jig 73 disposed on a support substrate 72, and a rotational shaft 77 pivoted by support members 74 at one end of the support substrate 72. Bracket set pins 75 are connected to the rotational shaft 77. The bracket set pins 75 are adapted to engage in the holes 62 formed in the brackets B. Further, a fixing means 76 is disposed to the rotational shaft 77. The fixing means 76 in this embodiment comprises an air cylinder, by which the rotational shaft 77 is fixed and the seat frame F engaged by way of the rotational shaft 77 and the bracket set pins 75 are fixed.

Figure 12:
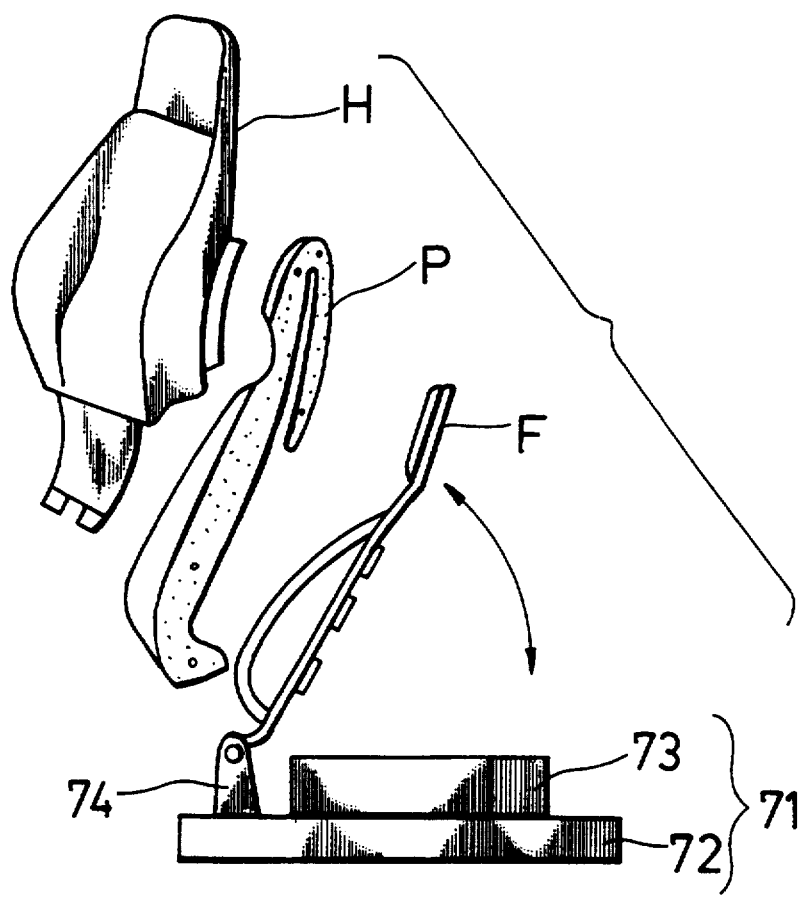
FIG. 12 is an explanatory view illustrating a step of the third embodiment according to the present invention.
Figure 13:
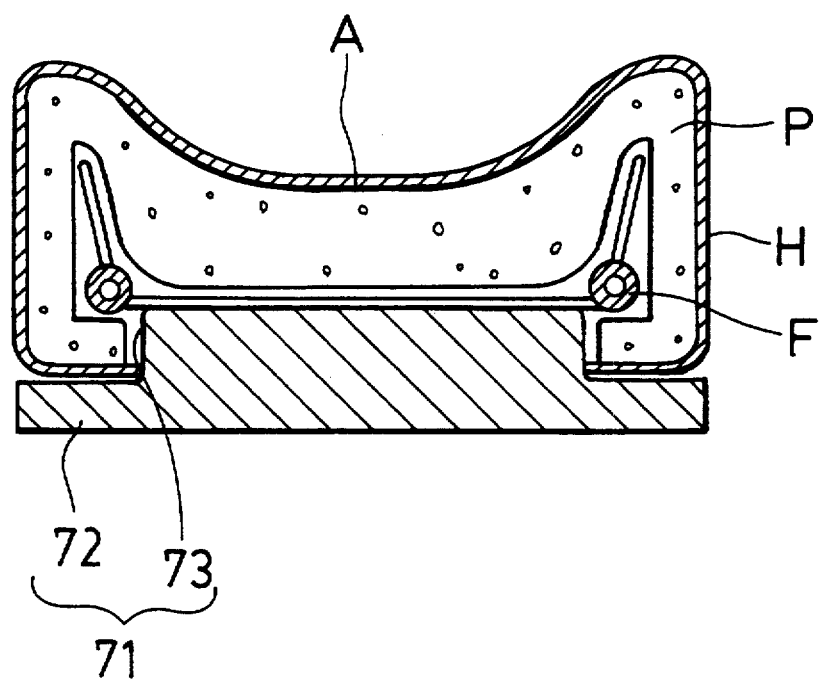
FIG. 13 is an explanatory view illustrating a step of the third embodiment according to the present invention.

Then, after the coating step 10 of coating the reactive hot-melt adhesives A to the cushioning pad P, the seat frame F is assembled to the attaching die. As shown in FIG. 11, the seat frame F is assembled by fitting the holes 61, 62 in the brackets B of the frame F to the bracket set pins 75 formed on the rotational shaft 77. Then, as shown in FIG. 12, the cushioning pad P is attached to the seat frame F that is assembled to the attaching die 71 and, then, the skin material H is attached to the cushioning pad P on the side of the adhesive coating surface. In this case, it is preferred to apply rubber paste, hot-melt adhesive or the like to the rear side of the cushioning pad P and then attach the pad to the seat frame F.

The seat frame F, the cushioning pad P and the skin material H attached in this way in the assembling step 70 are turned down to the side of the frame receiving jig 73 around the rotational shaft 77 as a center and then secured by the air cylinder. Then, during heating step 40 the seat frame F, the cushioning pad P and the skin material H are heated by the heating die 41 from the side of the skin material and further, the cooling/press-bonding step 50 is conducted.

With the method described above, the skin material and the cushioning pad can be molded to the seat frame.

What is claimed is:

1. A method of manufacturing a seat comprising an air permeable skin material, a cushioning pad and a frame by using adhesives in which said skin material and said cushioning pad are bonded to each other by means of reactive hot-melt adhesives, wherein the method comprises the following steps:

coating adhesives to one side of said cushioning pad, assembling said frame to an attaching die, attaching said cushioning pad to said frame which has been assembled to said attaching die, and attaching said one side of said skin material to the cushioning pad, heating with a heating die said frame, said cushioning pad and said skin material from a second side of said skin material, and applying cooling under pressure with a cooling die from said second side of said skin material subsequent to said heating step, and wherein the attaching die comprises a frame receiving jig mounted on a support substrate and a rotational shaft mounted to one end of said support substrate said shaft including bracket set pins attached to opposite ends of said shaft, said frame formed with two lower sides in which holes are formed, said bracket set pins receivable in said holes so that said frame, said cushioning pad and said skin can be rotated down toward the side of said frame receiving jig so that said heating and cooling steps can be done.

2. A seat manufacturing method as defined in claim 1, wherein the cushioning pad is covered with said skin material and said skin is formed into a bag-shaped member and said skin material in the form of the bag is assembled to the frame which has been previously attached to the attaching die.

* * * * *